United States Patent
Decker

(10) Patent No.: US 6,659,040 B1
(45) Date of Patent: Dec. 9, 2003

(54) SELF-METERING FEED DISPENSING SYSTEM

(76) Inventor: Paul Decker, 42906 Colony Rd., Olivet, SD (US) 57052

(*) Notice: Subject to any disclaimer, the term of this patent is extended or adjusted under 35 U.S.C. 154(b) by 0 days.

(21) Appl. No.: 10/147,625

(22) Filed: May 16, 2002

(51) Int. Cl.7 ................................................. A01K 5/01
(52) U.S. Cl. ................................................. 119/52.1
(58) Field of Search ................................ 119/56.2, 52.4, 119/57.4, 52.1, 53

(56) References Cited

U.S. PATENT DOCUMENTS

| | | | |
|---|---|---|---|
| 570,569 A | * 11/1896 | Smith | 119/53 |
| 694,760 A | * 3/1902 | Lathrop | 119/51.5 |
| 846,175 A | * 3/1907 | Xevers | 119/53 |
| 2,618,238 A | * 11/1952 | Travis | 119/52.1 |
| 2,808,029 A | * 10/1957 | Geerlings | 119/53.5 |
| 2,826,171 A | * 3/1958 | Piel | 119/52.1 |
| 3,085,552 A | 4/1963 | Pilch | |
| 3,105,463 A | 10/1963 | Pilch | |
| 4,180,136 A | 12/1979 | Jones | |
| 4,200,060 A | 4/1980 | Van Daele | |
| 4,538,548 A | * 9/1985 | Page | 119/52.1 |
| 5,233,941 A | * 8/1993 | Ayliffe et al. | 119/57.91 |
| 5,243,930 A | * 9/1993 | Rahm | 119/54 |
| 5,263,437 A | * 11/1993 | Murphrey | 119/53.5 |
| 5,794,561 A | * 8/1998 | Schulz | 119/52.1 |
| 5,816,191 A | 10/1998 | Beaudion et al. | |
| 5,850,805 A | * 12/1998 | Kleinsasser | 119/54 |
| 6,129,049 A | * 10/2000 | Rasmussen et al. | 119/52.1 |
| 6,152,078 A | 11/2000 | Romeu Guardia | |

FOREIGN PATENT DOCUMENTS

DE 2818392 A * 11/1979 ............ A01K/5/02

* cited by examiner

*Primary Examiner*—Charles T. Jordan
*Assistant Examiner*—John W. Zerr
(74) *Attorney, Agent, or Firm*—Kaardal & Leonard, LLP

(57) ABSTRACT

A self-metering feed dispensing system including a feed supply hopper having an interior for receiving feed. The feed supply hopper has upper and lower portions, with the upper portion extending over the lower portion and being removably mounted on the lower portion for permitting access to the interior. The lower portion may comprise a pair of hopper sections each terminating at a bottom of the lower portion in an outlet with an opening. The hopper sections may each have a perimeter wall converging toward the outlet and diverging away from the outlet. Optionally, the system may include a feed delivery tube extending downwardly from the feed supply hopper and having an upper end being in fluid communication with interior of the feed supply hopper and having a lower end, and a feed trough below the feed del very tube for holding feed delivered by the feed delivery tube.

19 Claims, 5 Drawing Sheets

SELF-METERING FEED DISPENSING SYSTEM

BACKGROUND OF THE INVENTION

1. Field of the Invention

The present invention relates to feed dispensers and more particularly pertains to a new self-metering feed dispensing system for dispensing feed to a feeder trough on an as-needed basis depending upon the amount of feed available in the trough.

2. Description of the Prior Art

The use of feed dispensers for the dispensing of animal or livestock feed is known in the prior art. More specifically, the known feed dispensers typically require some intervention by either a human or an automatic mechanism to cause the feed to be dispensed, typically on a periodic basis at various intervals. If the feed dispensing is performed automatically and periodically, the amount of feed dispensed may be too much or too little unless the feed dispenser also measures the amount of feed needed. Typically, some external actor, either human or mechanical, must monitor the amount of feed available to the animal and determine if additional feed, and in what quantity, needs to be dispensed. These known dispensers thus rely upon a person to monitor the quantity of feed available to the animal, which can be time consuming, or employ relatively complex mechanical apparatus that can malfunction due to jamming, wear, or other mechanical problems.

It would therefore be desirable to have a feed dispenser that dispenses feed on an as-needed basis depending upon the amount of feed available in the trough without requiring regular human intervention to determine the need and without employing mechanisms that require maintenance and are subject to breaking down.

SUMMARY OF THE INVENTION

In view of the foregoing disadvantages inherent in the known types of feed dispensers now present in the prior art, the present invention provides a new self-metering feed dispensing system wherein the same can be utilized for dispensing feed to a feeder trough on an as-needed basis depending upon the amount of feed available in the trough.

To attain this, the present invention generally comprises a feed supply hopper having an interior for receiving feed. The feed supply hopper has an upper portion and a lower portion, with the upper portion of the feed supply hopper extending over the lower portion. The lower portion of the feed supply hopper may comprise a pair of hopper sections, with each of the hopper sections terminating at a bottom of the lower portion in an outlet with an opening. Each of the hopper sections may have a perimeter wall, with the perimeter wall of each hopper section converging toward the outlet and diverging away from the outlet.

In one embodiment of the invention, the system may additionally include a feed delivery tube extending downwardly from the feed supply hopper and having an upper end being in fluid communication with the interior of the feed supply hopper and having a lower end. The system may also include a feed trough for holding feed delivered by the feed delivery tube for consumption by livestock. The feed trough may be positioned below the feed delivery tube, and define a channel having an upper lip positioned on opposite sides of the channel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the feed dispensing system is the continual dispensing of feed on an as-needed basis to the feed trough so that a substantial feed supply may be placed in the hopper so that frequent refilling can be avoided and feed is transferred to the feed trough only as needed to meet the animal's consumption.

Other advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
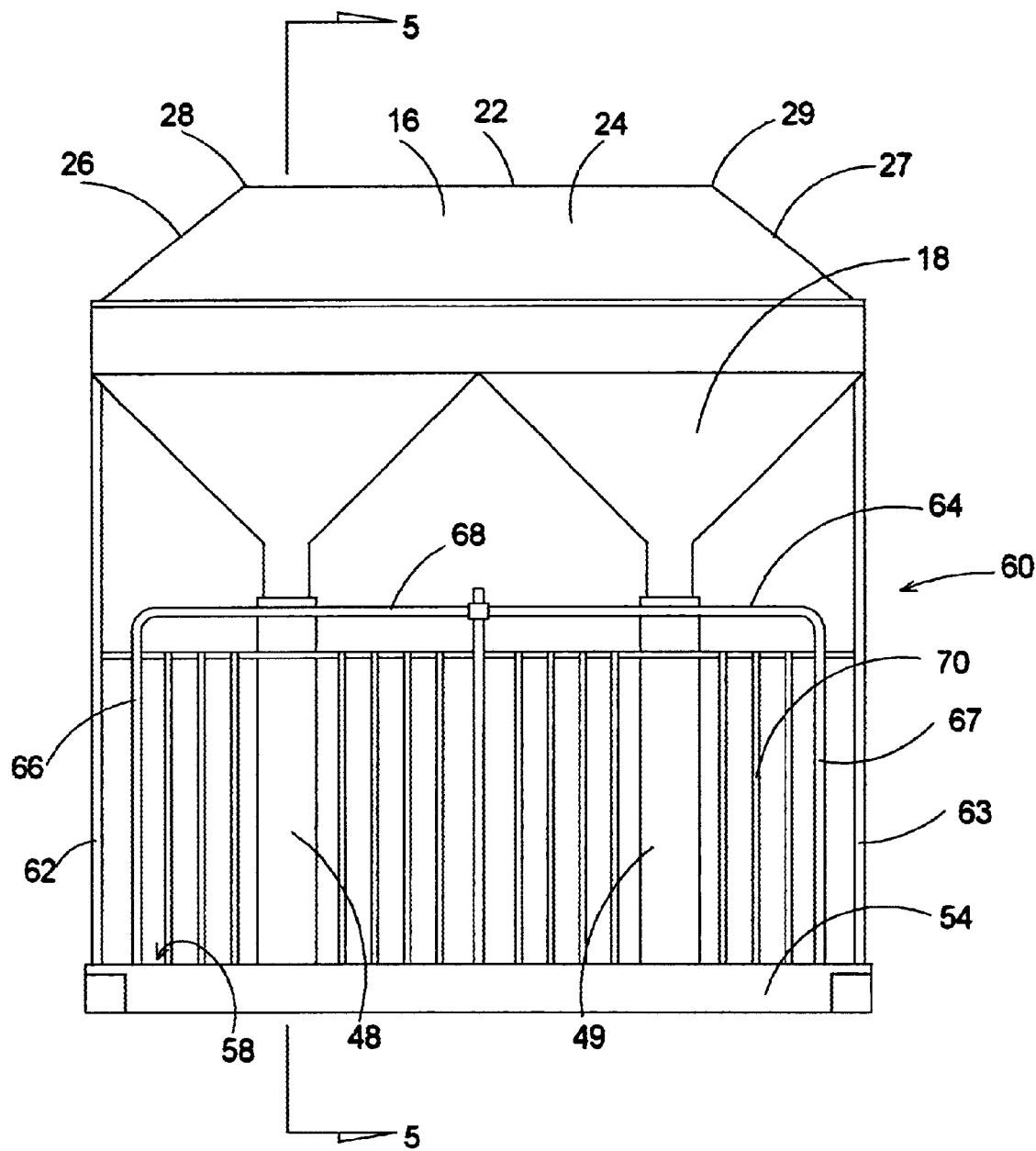
FIG. 1 is a schematic front view of a new self-metering feed dispensing system according to the present invention.
Figure 2:
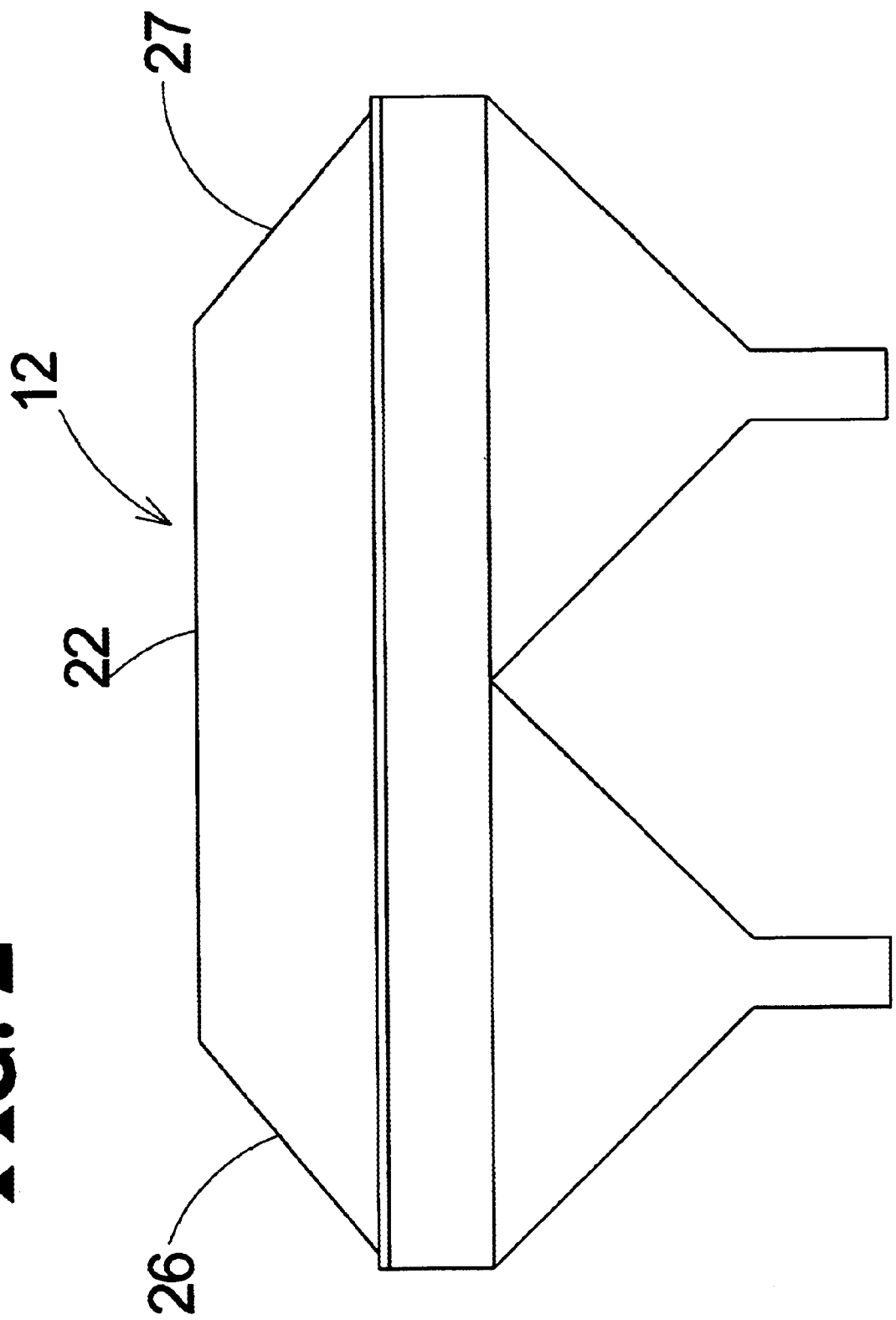
FIG. 2 is a schematic front view of the feed supply hopper of the present invention.
Figure 3:
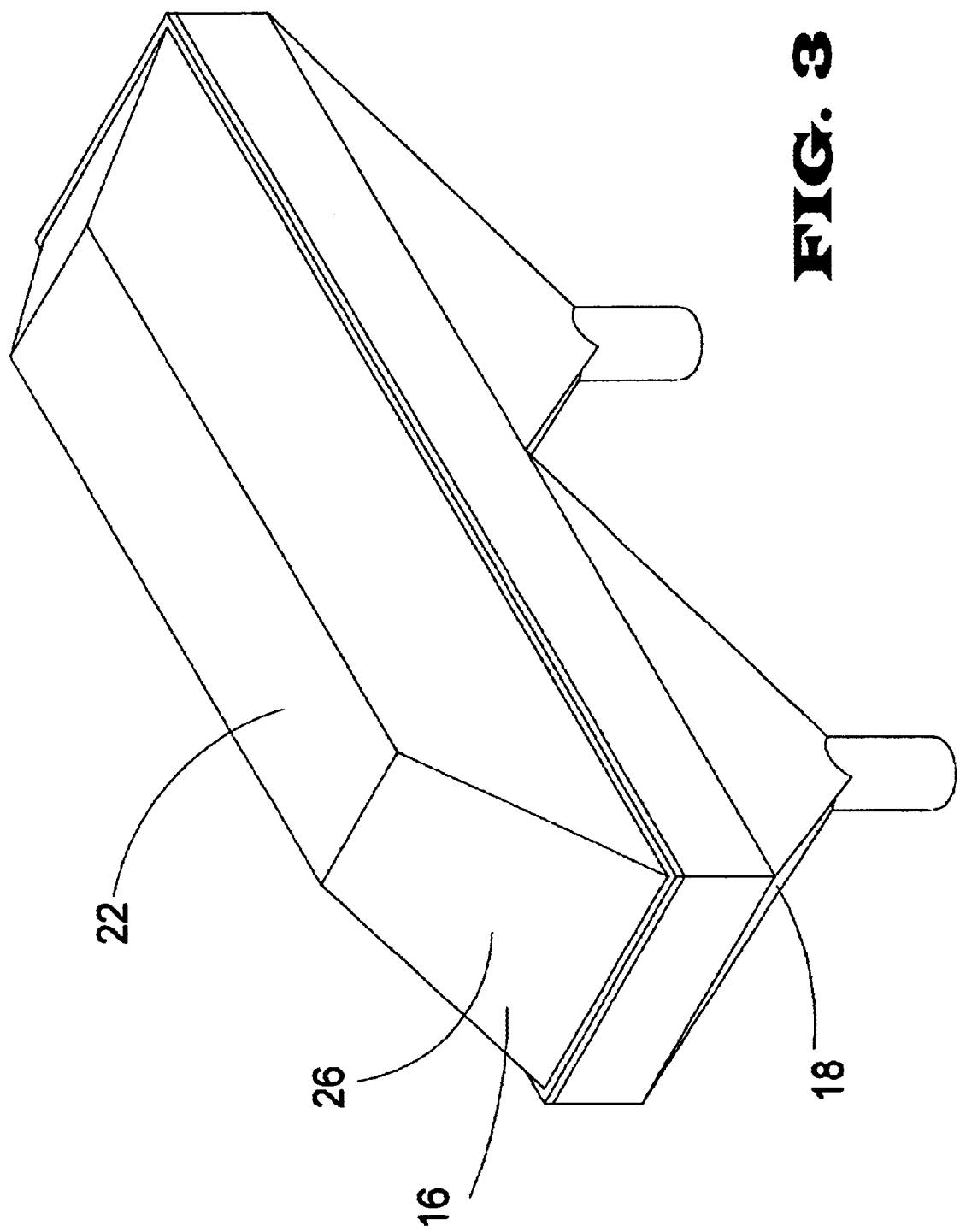
FIG. 3 is a schematic side view of the feed supply hopper of the present invention.
Figure 4:
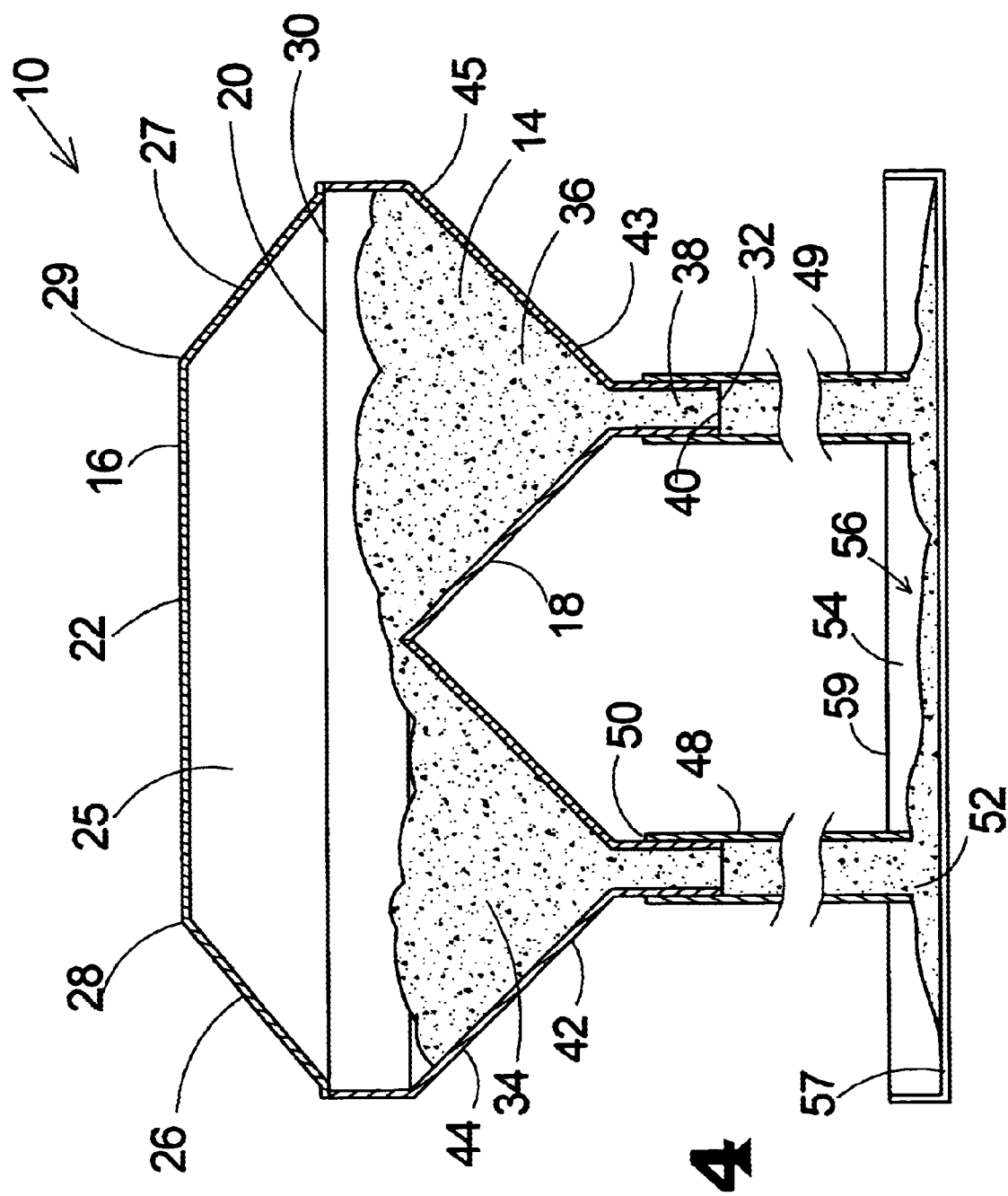
FIG. 4 is a schematic sectional view the feed dispensing system of the present invention.
Figure 5:
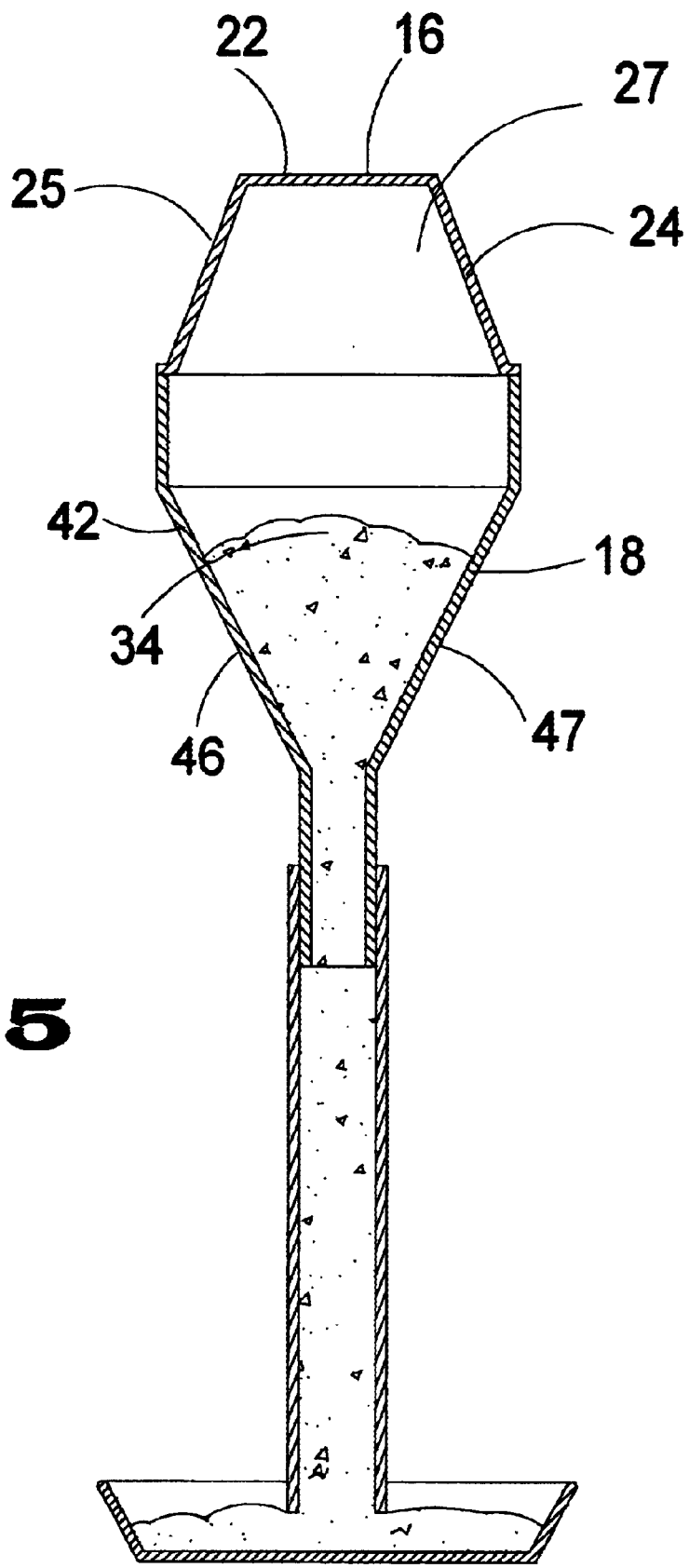
FIG. 5 is a schematic sectional view of the feed dispensing system taken along line 5—5 of FIG. 1.

With reference now to the drawings, and in particular to FIGS. 1 through 5 thereof, a new self-metering feed dispensing system embodying the principles and concepts of the present invention and generally designated by the reference numeral 10 will be described.

As best illustrated in FIGS. 1 through 5, the self-metering feed dispensing system 10 may generally comprise a feed supply hopper 12, a feed delivery tube 48, 49, a feed trough 54, and a support assembly 60.

The feed dispensing system 10 of the invention dispenses feed for livestock. The system 10 includes a feed supply hopper 12 having an interior 14 for receiving feed, such as a dry feed having a granular or friable character that is relatively free flowing. The feed supply hopper 12 may have an upper portion 16 and a lower portion 18. In one highly preferred embodiment of the invention, the upper and lower portions are formed by a single piece of material, however the invention is not limited to a single piece feed supply hopper and the upper portion 16 may be removably mounted on the lower portion 18 for permitting access to the interior 14 of the feed supply hopper 12 to facilitate filling of the interior with feed. A beltline 20 of the feed supply hopper may extend along a juncture between the upper 16 and lower 18 portions. In embodiments where the feed supply hopper comprises more than one piece, the upper 16 and lower 18 portions. may be separable from each other at the beltline 20. The beltline 20 may form a substantially rectangular perimeter of the feed supply hopper in a horizontal plane.

The upper portion 16 may extend over the lower portion 18. The upper portion 16 may have a peak 22. The upper portion 16 may have a pair of side walls 24, 25 and a pair of end walls 26, 27 extending between the peak 22 and the beltline 20. The pair of side walls 24, 25 may extend downwardly and outwardly from the peak 22. The pair of end walls 26, 27 may extend downwardly and outwardly from ends 28, 29 of the peak 22. The side walls 24, 25 and the end walls 26, 27 may form a continuous lid wall above the lower portion 18.

The lower portion 18 has a top 30 and a bottom 32. The top of the lower portion 18 may be substantially open. The lower portion 18 may comprise a pair of hopper sections 34, 36. Each of the hopper sections 34, 36 may terminate at the bottom 32 of the lower portion 18 in an outlet 38 with an opening 40. The hopper sections 34, 36 may be substantially tubular at the outlet 38. Each of the hopper sections 34, 36 may have a perimeter wall 42, 43. The perimeter wall 42 may comprise a plurality of wall panels. The wall panels of each perimeter wall 42, 43 may converge together toward the bottom 32 of the lower portion 18 and diverge away from each other toward the top 30 of the lower portion 18. The plurality of wall panels may include four wall panels 44, 45, 46, and 47, and the wall panels may be substantially planar. Each of the wall panels lying in planes oriented at angles of approximately 45 degrees with respect to the horizontal.

The system 10 may include a feed delivery tube 48, 49 that extends downwardly from each of the hopper sections 34, 36 of the feed supply hopper 12. The feed delivery tube 48 may have an upper end 50 being in fluid communication with the interior 14 of the feed supply hopper 12. The upper end 50 may be mounted on the outlet 38 of one of the hopper sections 34, 36. The feed delivery tube 48 has a lower end 52. In one illustrative embodiment of the invention, the feed delivery tube 48 is a substantially cylindrical tube.

The system 10 of the invention may include a feed tray or trough 54 or tray for holding feed delivered by the feed delivery tube 48 for consumption by livestock. The feed trough 54 may be positioned below the feed delivery tube 48 and the lower end 52 thereof. The feed trough 54 may define a channel 56 having upper lips 58, 59 positioned on opposite sides of the channel 56. The upper lips 58, 59 may define a plane extending above the channel 56. In one embodiment of the invention, the lower end 52 of the feed delivery tube 48 may be positioned in the channel 56 of the feed trough 54, and the feed delivery tube may extend through the plane defined by the upper lips such that the lower end of the feed delivery tube is positioned below the plane. The channel 56 may have an upper surface 57 below the lower end 52, and in one embodiment of the invention the spacing between the upper surface 57 and the lower end 52 is between approximately 1 inch and approximately 3 inches.

The system 10 may also include a support assembly 60 for supporting the feed supply hopper 12 in an elevated position above a ground surface and the feed trough 54. The support assembly 60 may comprise a pair of spaced legs 62, 63 that depend downwardly from the feed supply hopper 12. Each of the spaced legs 62, 63 has an upper end mounted on one end of the feed supply hopper 12. The support assembly 60 may also include a pen fence 64 that extends between the spaced legs 62, 63. Each of the feed delivery tubes 48, 49 may be mounted on the pen fence 64. The pen fence 64 may have a pair of end members 66, 67, with each of the end members being positioned adjacent to one of the legs 62, 63. The pen fence 64 may include an upper member 68 that extends between the end members 66, 67. A plurality of upright members 70 may be positioned between the end members 66, 67.

In one preferred embodiment of the invention, the feed supply hopper 12 is filled and refilled with feed by a feed auger that extends above the feed supply hopper, and one or more holes may be formed in the upper portion 16 of the feed supply hopper to permit feed to be directed into the interior 14 of the feed supply hopper. Optionally, a conduit may be interposed between the feed supply auger and the feed supply hopper to guide the feed into the hopper.

In use, the feed supply hopper is filled with feed, and in embodiments where the feed supply hopper comprises more than one piece, the upper portion 16 of the feed supply hopper 14 may be removed from the lower portion 18 to expose the open top 30 of the lower portion so that feed may be filled into the interior 14 of the feed supply hopper 12. Once the interior is filled with feed, the upper portion 16 may be replaced on the lower portion 18. The feed flows from the interior 14 through the feed delivery tube and out into the channel of the feed trough. The channel of the feed trough is filled with feed until the level of the feed in the trough rises above the lower end of the feed delivery tube and the further flow of feed from the lower end of the feed delivery tube is resisted until feed is removed from the channel by feeding animals. Once sufficient feed is removed from the channel by the feeding animals, further feed may flow from the feed delivery tube.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A feed dispensing system for dispensing feed for livestock, the system comprising:
   a feed supply hopper having an interior for receiving feed, the feed supply hopper having an upper portion and a lower portion comprising a pair of hopper sections, the upper portion of the feed supply hopper extending over the lower portion;

a feed delivery tube extending downwardly from the feed supply hopper, the feed delivery tube having an upper end being in fluid communication with the interior of the feed supply hopper, the feed delivery tube having a lower end;

wherein the feed delivery tube has an interior and upper and lower ends, and the interior of the feed delivery tube between the upper and lower ends is free of structure.

2. The system of claim 1 additionally comprising a feed trough for holding feed delivered by the feed delivery tube for consumption by livestock, the feed trough being positioned below the feed delivery tube, the feed trough defining a channel having an upper lip positioned on opposite sides of the channel.

3. The system of claim 2 wherein the upper lip of the feed trough defines a plane, the lower end of the feed delivery tube being positioned in the channel of the feed trough.

4. The system of claim 3 wherein the feed delivery tube extends through the plane such that the lower end of the feed delivery tube is positioned below the plane.

5. The system of claim 1 wherein the lower portion has a top and bottom, and the top of the lower portion is substantially open.

6. The system of claim 1 wherein the lower portion of the feed supply hopper comprises a pair of hopper sections, each of the hopper sections terminating at a bottom of the lower portion in an outlet with an opening.

7. The system of claim 6 wherein each of the hopper sections has a perimeter wall, the perimeter wall comprising a plurality of wall panels, the wall panels of each perimeter wall converging together toward the bottom of the lower portion and diverging toward a top of the lower portion.

8. The system of claim 7 wherein the plurality of wall panels includes four wall panels, each of the wall panels lying in planes oriented at angles of approximately 45 degrees with respect to the horizontal.

9. The system of claim 1 additionally comprising a support assembly for supporting the feed supply hopper in an elevated position above a ground surface.

10. The system of claim 1 wherein the upper portion is removably mounted on the lower portion for permitting access to the interior of the feed supply hopper to facilitate filling of the interior with feed.

11. The system of claim 10 wherein the feed supply hopper has a beltline extending along a juncture between the upper and lower portions of the feed supply hopper, the upper and lower portions being separable at the beltline.

12. A feed dispensing system for dispensing feed for livestock, the system comprising:

a feed supply hopper having an interior for receiving feed, the feed supply hopper having an upper portion and a lower portion, the upper portion of the feed supply hopper extending over the lower portion;

a feed delivery tube extending downwardly from the feed supply hopper, the feed delivery tube having an upper end being in fluid communication with the interior of the feed supply hopper, the feed delivery tube having a lower end;

wherein the upper portion has a peak, a pair of side walls and a pair of end walls extending between the peak and a beltline of the feed supply hopper, the pair of side walls extending downwardly and outwardly from the peak, the pair of end walls extending downwardly and outwardly from ends of the peak.

13. A feed dispensing system for dispensing feed for livestock, the system comprising:

a feed supply hopper having an interior for receiving feed, the feed supply hopper having an upper portion and a lower portion, the upper portion of the feed supply hopper extending over the lower portion;

a feed delivery tube extending downwardly from the feed supply hopper. the feed delivery tube having an upper end being in fluid communication with the interior of the feed supply hopper, the feed delivery tube having a lower end;

wherein the lower portion of the feed supply hopper comprises a pair of hopper sections. each of the hopper sections terminating at a bottom of the lower portion in an outlet with an opening;

wherein the hopper sections are substantially tubular at the outlet.

14. The A feed dispensing system for dispensing feed for livestock the system comprising:

a feed supply hopper having an interior for receiving feed, the feed supply hopper having an upper portion and a lower portion, the upper portion of the feed supply hopper extending over the lower portion;

a feed delivery tube extending downwardly from the feed supply hopper, the feed delivery tube having an upper end being in fluid communication with the interior of the feed supply hopper, the feed delivery tube having a lower end;

a support assembly for supporting the feed supply hopper in an elevated position above a ground surface;

wherein the support assembly comprises:

a pair of spaced legs depending downwardly from the feed supply hopper, each of the spaced legs having an upper end mounted on one end of the feed supply hopper; and a pen fence extending between the spaced legs, the feed delivery tube being mounted on the pen fence.

15. A feed dispensing system for dispensing feed for livestock, the system comprising:

a feed supply hopper having an interior for receiving feed, the feed supply hopper having an upper portion and a lower portion, the upper portion of the feed supply hopper extending over the lower portion, the lower portion of the feed supply hopper comprising a pair of hopper sections, each of the hopper sections terminating at a bottom of the lower portion in an outlet with an opening, each of the hopper sections having a perimeter wall, the perimeter wall of each hopper section converging toward the outlet and diverging away from the outlets;

wherein the hopper sections are substantially tubular at the outlet.

16. The system of claim 15 wherein the lower portion has a top and bottom and the top of the lower portion is substantially open.

17. The system of claim 15 additionally comprising a feed delivery tube extending downwardly from the feed supply hopper, the feed delivery tube having an upper end being in fluid communication with the interior of the feed supply hopper.

18. A feed dispensing system for dispensing feed for livestock, the system comprising:

a feed supply hopper having an interior for receiving feed, the feed supply hopper having an upper portion and a lower portion, the upper portion of the feed supply hopper extending over the lower portion, the lower portion of the feed supply hopper comprising a pair of hopper sections, each of the hopper sections terminating at a bottom of the lower portion in an outlet with an opening, each of the hopper sections having a perimeter wall, the perimeter wall of each hopper section converging toward the outlet and diverging away from the outlet;

wherein the upper portion has a peak, a pair of side walls and a pair of end walls extending between the peak and a beltline of the feed supply hopper, the pair of side walls extending downwardly and outwardly from the peak, the pair of end walls extending downwardly and outwardly from ends of the peak.

19. A feed dispensing system for dispensing feed for livestock, the system comprising:

a feed supply hopper having an interior for receiving feed, the feed supply hopper having an upper portion and a lower portion, a beltline extending along a juncture between the upper and lower portions, the beltline forming a substantially rectangular perimeter in a horizontal plane;

wherein the upper portion extends over the lower portion, the upper portion having a peak, a pair of side walls and a pair of end walls extending between the peak and the beltline, the pair of side walls extending downwardly and outwardly from the peak, the pair of end walls extending downwardly and outwardly from ends of the peak, the side walls and the end walls forming a continuous lid wall above the lower portion;

wherein the lower portion has a top and bottom, the top of the lower portion being substantially open, the lower portion comprising a pair of hopper sections, each of the hopper sections terminating at the bottom of the lower portion in an outlet with an opening, the hopper sections being substantially tubular at the outlet, each of the hopper sections having a perimeter wall, the perimeter wall comprising a plurality of wall panels, the wall panels of each perimeter wall converging together toward the bottom of the lower portion and diverging toward the top of the lower portion, the plurality of wall panels including four wall panels, each of the wall panels lying in planes oriented at angles of approximately 45 degrees with respect to the horizontal;

a feed delivery tube extending downwardly from the feed supply hopper, the feed delivery tube having an upper end being in fluid communication with the interior of the feed supply hopper, the upper end being mounted on the outlet of one of the hopper sections, the feed delivery tube having a lower end, the feed delivery tube being a cylindrical tube;

a feed trough for holding feed delivered by the feed delivery tube for consumption by livestock, the feed trough being positioned below the feed delivery tube, the feed trough defining a channel having an upper lip positioned on opposite sides of the channel, the upper lip defining a plane, the lower end of the feed delivery tube being positioned in the channel of the feed trough, the feed delivery tube extending through the plane such that the lower end of the feed delivery tube is positioned below the plane;

a support assembly for supporting the feed supply hopper in an elevated position above a ground surface, the support assembly comprising:

a pair of spaced legs depending downwardly from the feed supply hopper, each of the spaced legs having an upper end mounted on one end of the feed supply hopper; and a pen fence extending between the spaced legs, the feed delivery tube being mounted on the pen fence, the pen wall having a pair of end members, each of the end members being positioned adjacent to one of the legs, an upper member extending between the end members, a plurality of upright members positioned between the end members.

\* \* \* \* \*